United States Patent [19]

Scheib et al.

[11] 4,022,092
[45] May 10, 1977

[54] MULTIPLE BLADE SCRAP SAW FOR PIPE MILL

[75] Inventors: William R. Scheib, Sewickley, Pa.; Ralph M. Shaffer, Jr., Huffman, Tex.

[73] Assignee: Aetna-Standard Engineering Company, Ellwood City, Pa.

[22] Filed: Feb. 25, 1976

[21] Appl. No.: 661,371

[52] U.S. Cl. .................................. 83/306; 83/327; 83/329; 83/490
[51] Int. Cl.² ......................................... B26D 1/18
[58] Field of Search ............ 83/327, 306, 307, 329, 83/490, 356.3

[56] References Cited

UNITED STATES PATENTS

| | | | |
|---|---|---|---|
| 1,242,478 | 10/1917 | Rosewarne | 83/329 X |
| 3,207,020 | 9/1965 | Passoni | 83/327 |
| 3,491,637 | 1/1970 | Hasten et al. | 83/490 X |

*Primary Examiner*—Frank T. Yost
*Attorney, Agent, or Firm*—Mandeville and Schweitzer

[57] ABSTRACT

The disclosure is directed to a rotary saw for cutting sections of scrap pipe in a pipe forming mill. The saw includes a frame, mounted for rotation above the pass line and carrying cutting saws at each of two ends, enabling two cuts to be made for each revolution of the rotary frame. The individual saw mechanisms are mounted for rotation in the frame and are tied to the stationary frame of the apparatus in a manner to maintain the saw blades at all times in a vertical plane for cutting a horizontally moving pipe. Both of the saws are driven by a common, motor driven shaft, which is concentric with the rotary mounting shaft for the saw frame and is gear-connected to the respective saw blades. A pipe lifting cam is synchronously associated with the rotation of the saw frame, for lifting, supporting and confining the moving pipe each time a saw blade moves into cutting position. The entire scrap saw unit is movably mounted in relation to the pipe pass line, enabling the saw to be retracted well away from the pass line during normal operation of the mill.

In conjunction with the new scrap saw, there is desirably provided a kick-out system and receiving bin for the sawed-off scrap sections. The kick-out section, located just downstream of the scrap saw, is selectively operated during periods when the scrap saw is in operation but is deactivated for normal operations of the pipe mill.

14 Claims, 23 Drawing Figures

MULTIPLE BLADE SCRAP SAW FOR PIPE MILL

BACKGROUND AND SUMMARY OF INVENTION

In the production of continuous buttweld pipe, strip stock, known as skelp, is fed from a coil, through a heating furnace, and then through a forming and welding mill. In the forming and welding mill, the red hot skelp is first formed into a tube, in a multiple stand forming mill, and then the opposite edges of the skelp are brought together under pressure to form a weld.

Properly formed and buttwelded tubing typically is conveyed from the continuous buttweld mill to a stretch reducing mill, in which the pipe is subjected to a combination of rolling pressure and longitudinal tension, to produce a finished pipe having desired diameter and wall thickness characteristics. On the downstream side of the stretch reducing mill, there is typically provided a flying hot saw, which severs the stretch reduced pipe to the desired length, after which the individual lengths are conveyed to a cooling bed. All of the foregoing is well known and conventional.

In the initial start up of the continuous buttweld mill, a considerable amount of scrap pipe is produced while the skelp is being brought up the proper welding temperature. Where a stretch reducing mill is employed downstream of the forming and welding mill, it is not feasible to permit the scrap pipe to enter the stretch reducing mill, because of possible damage to the mill. Accordingly, it is necessary for the scrap portions of the pipe to be cut off and removed between the forming and welding mill and the stretch reducing mill. In the past, this has necessitated a considerable amount of heavy manual work, typically with the use of torches to cut the scrap into sections, which are then manually dragged out of the way and eventually picked up for reprocessing. Where a stretch reducing mill is not employed in the line, it is sometimes possible to utilize the regular production flying cut-off saw to sever the scrap sections during start up. However, even this is sometimes not possible, and in all events a substantial amount of heavy manual work is required in handling and removing the scrap sections severed by the production saw.

Pursuant to the invention, a novel and improved scrap saw is provided, which is suitable for installation downstream of the forming and welding mill (and upstream of a stretch reducing mill, if used). The scrap saw of the invention includes a rotary frame mounted above the pass line and carrying cutting saws at each of two ends, such that two cuts may be made for each revolution of the frame. This is particularly desirable in the handling of scrap, inasmuch as it permits the scrap to be severed into short, easily manageable lengths, while still permitting the rotary saw frame to be rotated at appropriately low speeds.

In accordance with one feature of the invention, the dual rotary saws are driven by a stationary drive motor, located on the main frame of the equipment. This enables a significant reduction in the weight of, and a corresponding simplification of the rotating parts of the saw mechanism.

Pursuant to another specific aspect of the invention, the individual saw blade mechanisms are supported by spaced inboard and outboard frame housings, which are fixed to a common shaft and mounted for rotation in unison. One of the frame housings encloses a drive train for rotating the saw blades, while the other housing encloses an orienting mechanism for maintaining the saw blades in a vertical plane at all times.

A synchronous cam arrangement is provided for supporting the pipe directly underneath the cutting area of the saw blades. The cam is arranged to rotate in accordance with the rotations of the saw frame, such that the pipe is engaged and raised into cutting position as a saw blade moves through the lowermost portions of its arc.

In accordance with another feature of the invention, the entire scrap saw mechanism is mounted on slideways, for movement between operative and retracted positions. When the mechanism is in its operative or working position, it is clamped securely to its slideways, for maximum rigidity of the mounting. For retracting and advancing movements, the clamping facility is released.

In the system of the invention, there is included an advantageous kick-out arrangement in the pipe conveying system, downstream of the scrap saw, enabling the short, cut-off scrap sections to be kicked out of the conveyor line and discharged into a reception bin.

Rotary saws in general are, of course, well known. Representative of the prior art, in this respect, are the Garling U.S. Pat. No. 1,923,261, the Passoni U.S. Pat. No. 3,207,020, and the Pferdekaemper U.S. Pat. No. 3,267,785. Thus, the present invention is not directed broadly to the concept of a rotary saw, but more specifically to structural features of a rotary saw which enable a dual or multiple saw mechanism to be provided, which is practical for utilization in the described environment.

For a more complete understanding of the above and other features and advantages of the invention, reference should be made to the following detailed description of a preferred embodiment and to the accompanying drawings.

DESCRIPTION OF A PREFERRED EMBODIMENT

Figure 1:
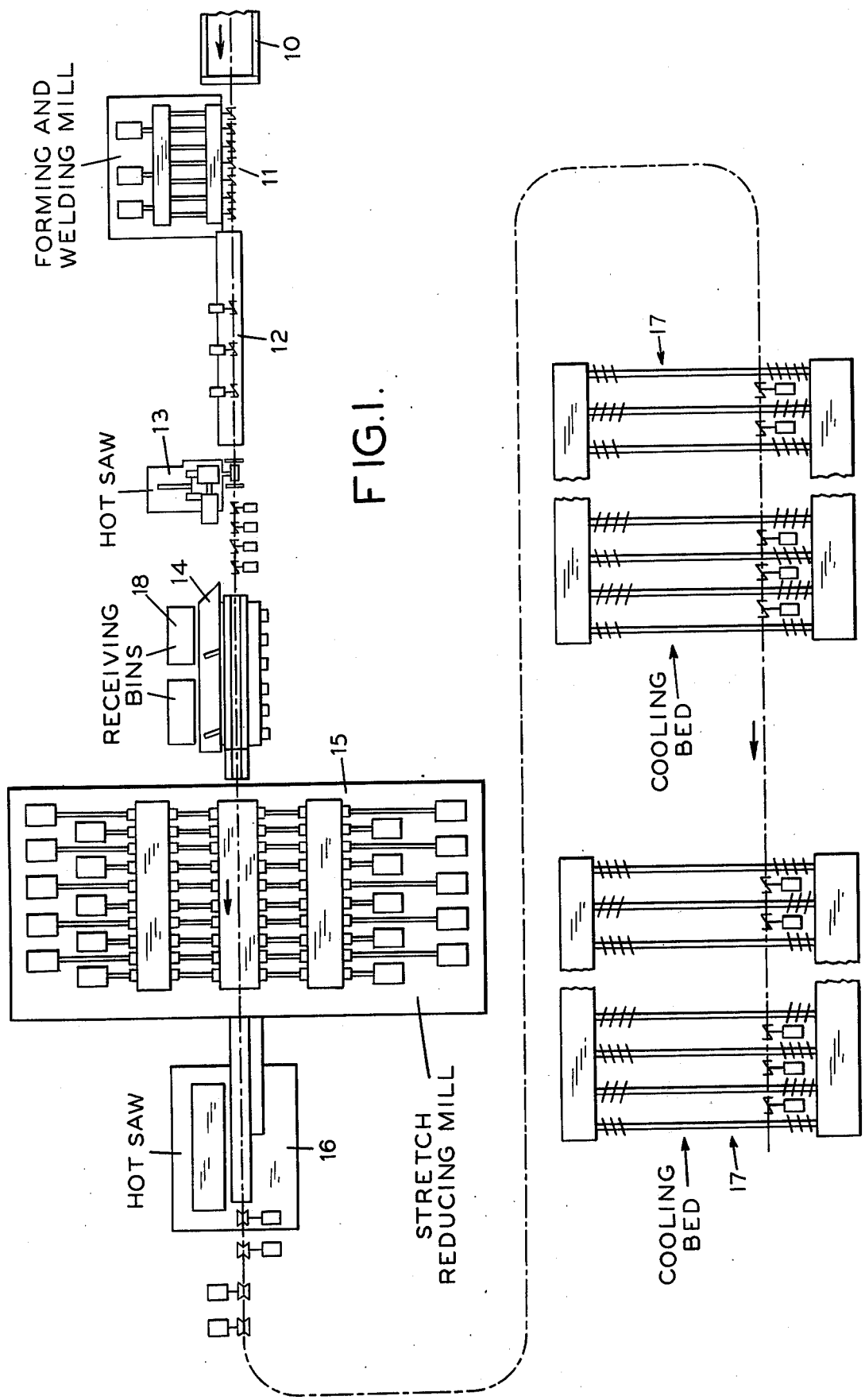
FIG. 1 is a highly simplified plan layout of a pipe mill, including a continuous buttweld mill, scrap cut-off saw and kick-out section, stretch reducing mill, production cut-off saw, and cooling beds.

Referring now to the drawings, and initially to FIG. 1 thereof, the reference numeral 10 designates generally the furnace section of a continuous buttweld pipe mill. The furnace receives skelp from a suitable supply (not shown), brings it to appropriate temperature, and discharges it into a forming and welding mill generally designated by the reference numeral 11. The red hot skelp, after being formed into a tube and buttweld to form a pipe, travels through a scrap saw inlet conveyor section 12, through a scrap saw section 13 and scrap kick-out section 14, all to be described hereinafter. During normal continuous production operations, the scrap saw and scrap kick-out sections are inoperative, and the buttwelded pipe passes on through these sections and into a stretch reducing mill generally designated by the reference numeral 15. In the stretch reducing mill, the buttwelded pipe is rolled and elongated in accordance with known techniques, to achieve a desired combination of final diameter and wall thickness.

Upon discharge from the stretch reducing mill, the pipe passes through a production flying hot saw section, generally designated by reference numeral 16. The production hot saw may be of conventional design, and is arranged to sever the finished pipe sections into appropriate commercial length. Thereafter, the individual cut sections of finished pipe are carried to a cooling bed, generally designated by the reference numeral 17. In a typical cooling bed, the individual pipe sections are progressed gradually from one side to the other of the bed, being permitted to cool gradually during such progression. The pipe sections are then removed from the cool side of the bed 17 and taken for shipment, storage, or further processing.

Although the continuous buttweld pipe mill is designed for uninterrupted, steady-state operation, there is always a transition period during the initial start up of the mill, when the skelp is being brought up to the desired operating temperature. During this start up phase, the leading end of the skelp welds imperfectly if at all in the forming and welding mill and must be scrapped. In the past, this has occasioned extensive manual labor, involving strenuous and hazardous work and considerable expense.

Pursuant to the invention, an improved form of rotary hot saw 13 is provided, for installation in the region immediately downstream of the forming and welding mill and useable in conjunction with the kick out section 14. During the transitional start up phase of the pipe welding mill, the rotary scrap saw 13 is put into operation and serves to continuously sever the oncoming, imperfectly formed pipe into short, easily handleable sections, which are automatically kicked out of the conveyor system and collected in receiving bins 18. Once the system has been brought to its steady-state condition and is delivering specification pipe, the scrap saw is rendered inoperative and withdrawn from the area of the pass line, enabling the welded pipe to proceed continuously on through the stretch reducing mill and to the production hot saw 16.

In accordance with one aspect of the invention, the scrap saw is of a unique and advantageous construction, such that, in a practical assembly useful in the environment of a continuous buttweld mill, a rotating saw structure may be provided with dual or multiple saw blades, for severing the leading end scrap section into desirably short, easily handleable sections. Referring now to FIGS. 2–5, the reference numeral 19 represents generally a base structure, on which is slideably supported a frame assembly 20. The frame assembly 20 mounts a support housing 21 carrying spaced bearings 22, 23 which rotatably journal a heavy tubular main shaft 24. A portion 25 of the main shaft extends in cantilever fashion forward of the housing 21 and mounts in fixed relation spaced inboard and outboard saw frame housings 26, 27. The saw frame housings desirably are of elongated form, are parallel to each other, and are symmetrically related to the heavy main shaft 24, so as to provide a generally balanced assembly.

Figure 4:
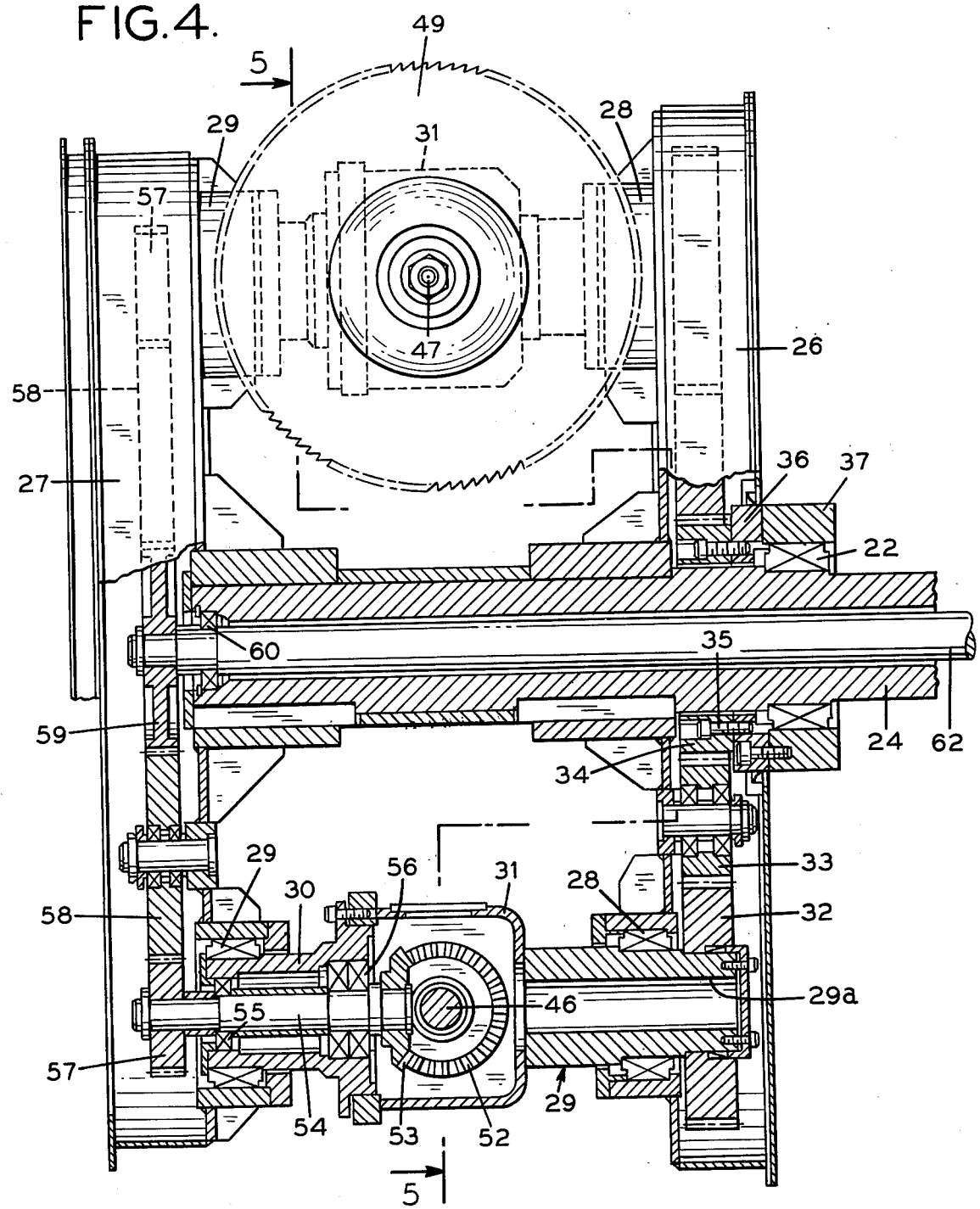
FIG. 4 is a cross sectional view as taken generally on line 4—4 of FIG. 3.

As shown best in FIG. 4, the frame housings 26, 27 are provided at their outer ends with bearing assemblies 28, 29, which rotatably mount saw supporting assemblies each comprising shaft sections 29, 30 and a gear housing 31. A portion 29a of the shaft section 29 extends through the bearing 28 and into the frame housing 26. The shaft portion 29a mounts a gear 32 which engages, through an idler pinion 33, a fixed ring gear 34. The ring gear is secured by bolts 35 to collars 36 and 37 forming fixed parts of the main shaft supporting housing 21.

With the ring gear 34 being thus fixed, when the saw frame housings 26, 27 are rotated along with the main shaft 24, the gears 32 tend to be rotated in relation to the housings. The gears 32 are selected to be the same size as the ring gears 34, such that, as the frame housing rotate, the rotational orientation of the gears 32 remains constant with respect to a fixed reference, thus maintaining a constant orientation of the shaft-housing assembly 29–31.

Rotation of the main shaft 24 at a controlled speed is effected by means of a worm gear 38 keyed to the shaft and driven by a worm 39. The latter is supported by bearing 40, 41 in the main housing 21 and is connected, by way of a torque limiting clutch 42, to a drive motor 43. As will be referred to hereinafter, the drive motor 43 is controlled in a manner to achieve appropriate synchronism between the rate of rotation of the saw frame housings 26–27 and the advancing movement of the emerging pipe.

Figure 5:
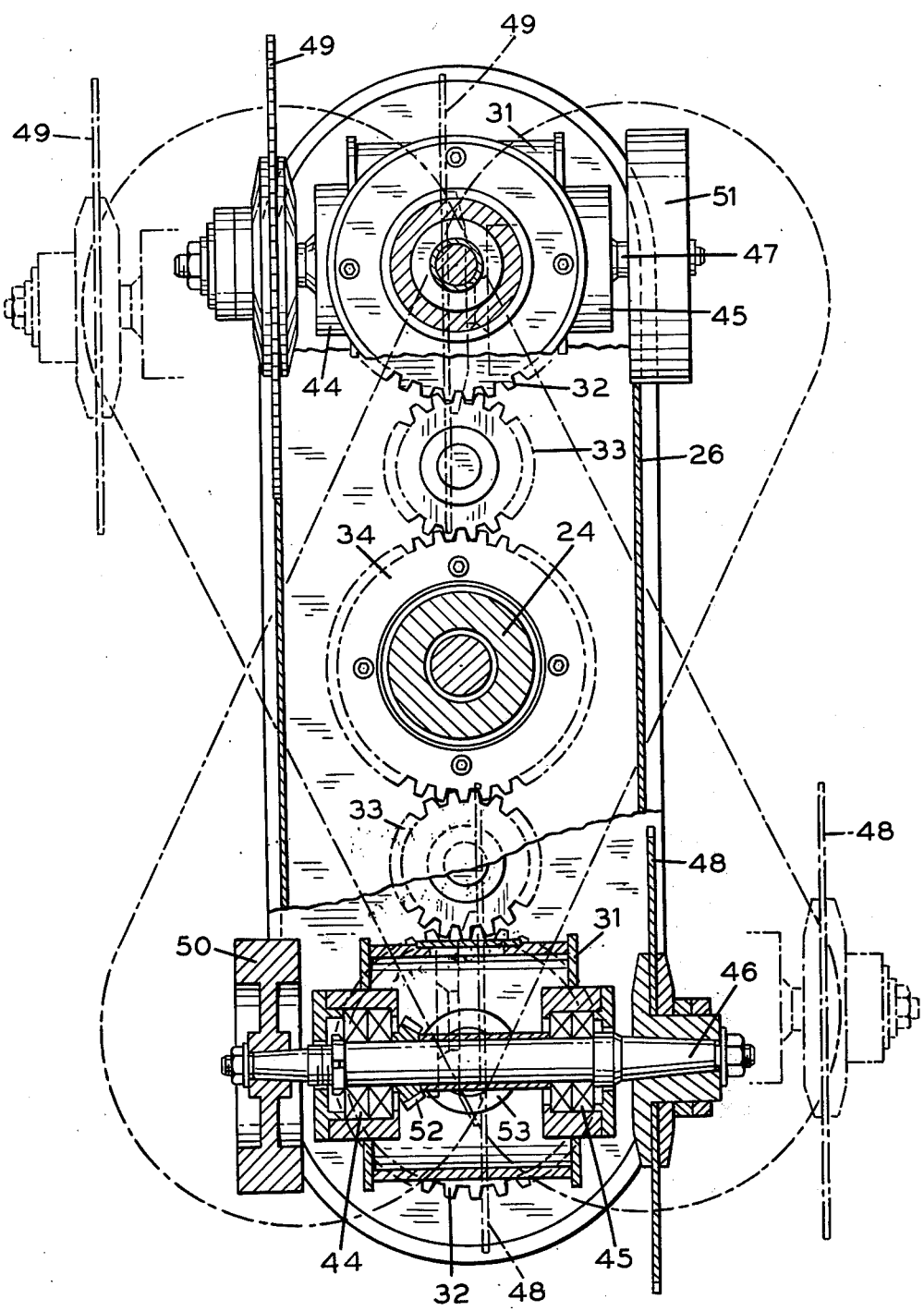
FIG. 5 is a cross sectional view as taken generally taken on line 5—5 of FIG. 4, illustrating the dual rotary saw in a plurality of positions.

As reflected particularly in FIG. 5, the gear housings 31 incorporate spaced bearings 44, 45, which rotatably support high speed shafts 46, 47. The shafts 46, 47 have portions which project from opposite ends of the gear housings. On one end of each of the shafts 46, 47 is mounted a saw blade 48, 49. At the opposite end of each shaft is mounted a combined counterbalance and fly wheel 50, 51.

Each of the high speed shafts 46, 47 mounts a bevel gear 52, meshing with a similar bevel gear 53 (see FIG. 4). The bevel gears 53 are keyed to the end of drive output shafts 54 journaled by bearings 55, 56 within the hollow shaft sections 30. The drive output shafts 54 include portions projecting into the outboard frame housing 27 and mounting pinions 57. The pinions 57 are driven through idler gears 58 from a common main drive gear 59 which is concentric with the main shaft 24.

Figure 2:
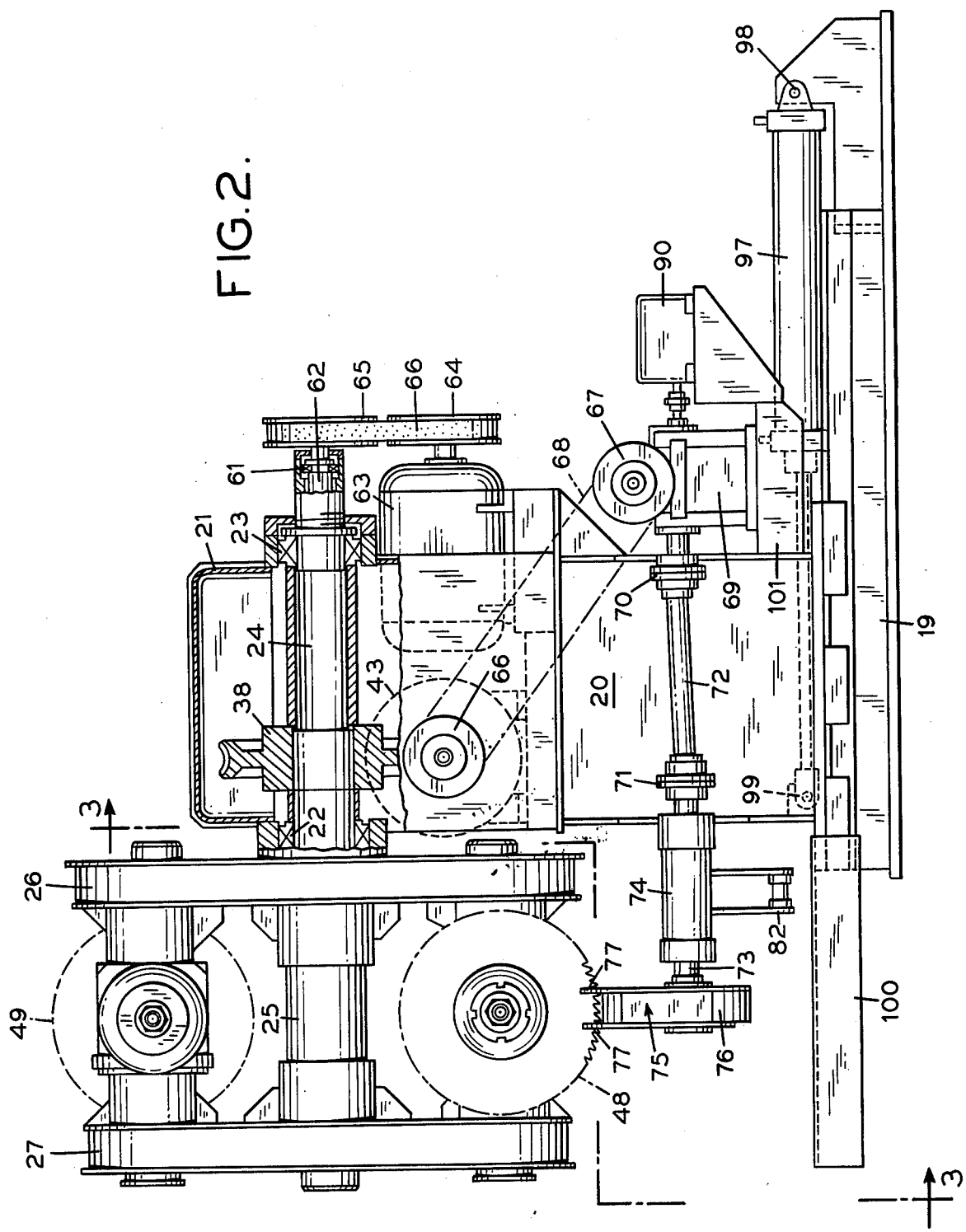
FIG. 2 is a side elevational view, partly in section, of a dual rotary scrap saw, constructed in accordance with the features of the invention, as utilized in the system of FIG. 1.

As reflected in FIGS. 2 and 4, the main drive shaft 24 is of tubular form and mounts spaced bearings 60, 61 at its opposite ends. An elongated, coaxially disposed common drive input shaft 62 extends through the hollow interior of the main shaft 24, and is supported by the spaced bearings 60, 61. At its outboard end, the drive input shaft 62 is connected to the common drive gear 59. Accordingly, upon rotation of the shaft 62, the respective saw blades 48, 49 will be driven through the gear trains 57, 58, 59, the drive output shafts 54 and the respective pairs of bevel gears 52, 53. The drive input shaft 62 is driven at relatively high speed, independently of rotation of the tubular main drive shaft 24, by means of a suitable drive motor 63 (FIG. 2), which drives the shaft 62 through pulleys 64, 65 and a belt 66.

As reflected in FIGS. 21 5, the respective gear trains controlling the rotation of the saw blades 48, 49, on the one hand, and controlling the constant rotational orientation of the saw blades in a vertical plane, on the other hand, are completely enclosed in the frame housings 26, 27, so as to be protected from the working environment.

Figure 3:
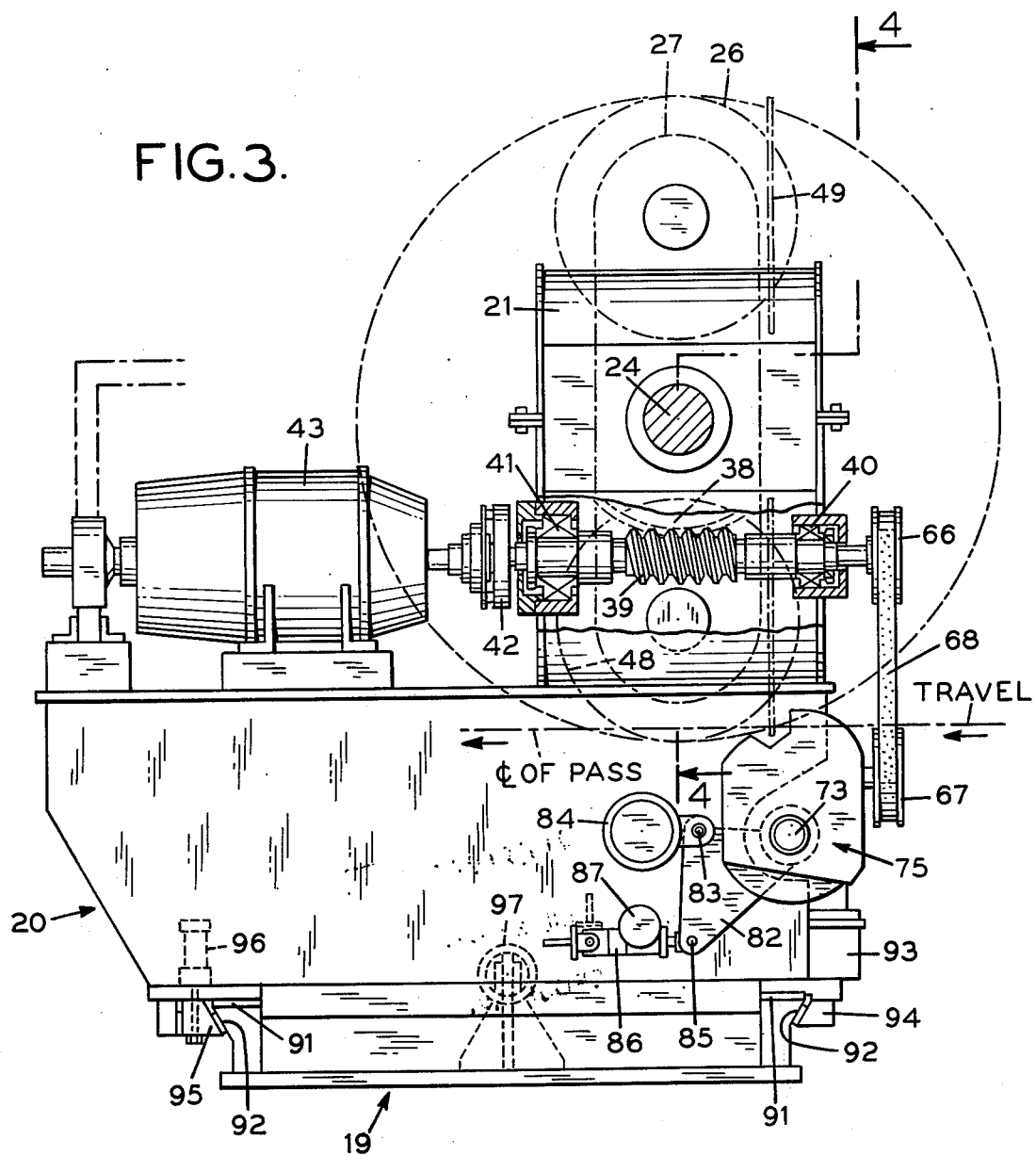
FIG. 3 is a cross sectional view as taken generally on line 3—3 of FIG. 2.

As reflected in FIG. 3, the outboard end of the shaft section supporting the worm 39 is connected, through pulleys 66, 67 and a timing belt 68, to a gear reducer 69 (FIG. 2). The gear reducer 69 is connected through universal joints 70, 71 and a connecting shaft 72 to a cam operating shaft 73, which is journaled in a movable bearing assembly 74. The shaft 73 carries, at its outboard end, a pipe positioning and confining cam 75, which is comprised of a main cam body 76 and spaced guide flanges 77. The cam 75 is positioned directly under the pass line of the formed pipe and is arranged to both lift and laterally confine the pipe during the moments when the saw blade 48 or 49 is passing through the cutting portion of its circular path. By means of the gear reducer 69, the cam 75 is accurately timed in relation to the rotary saw frame 26, 27, so as to be brought into its lifting and confining orientation when either of the two saw blades approaches its cutting position.

Figure 6:
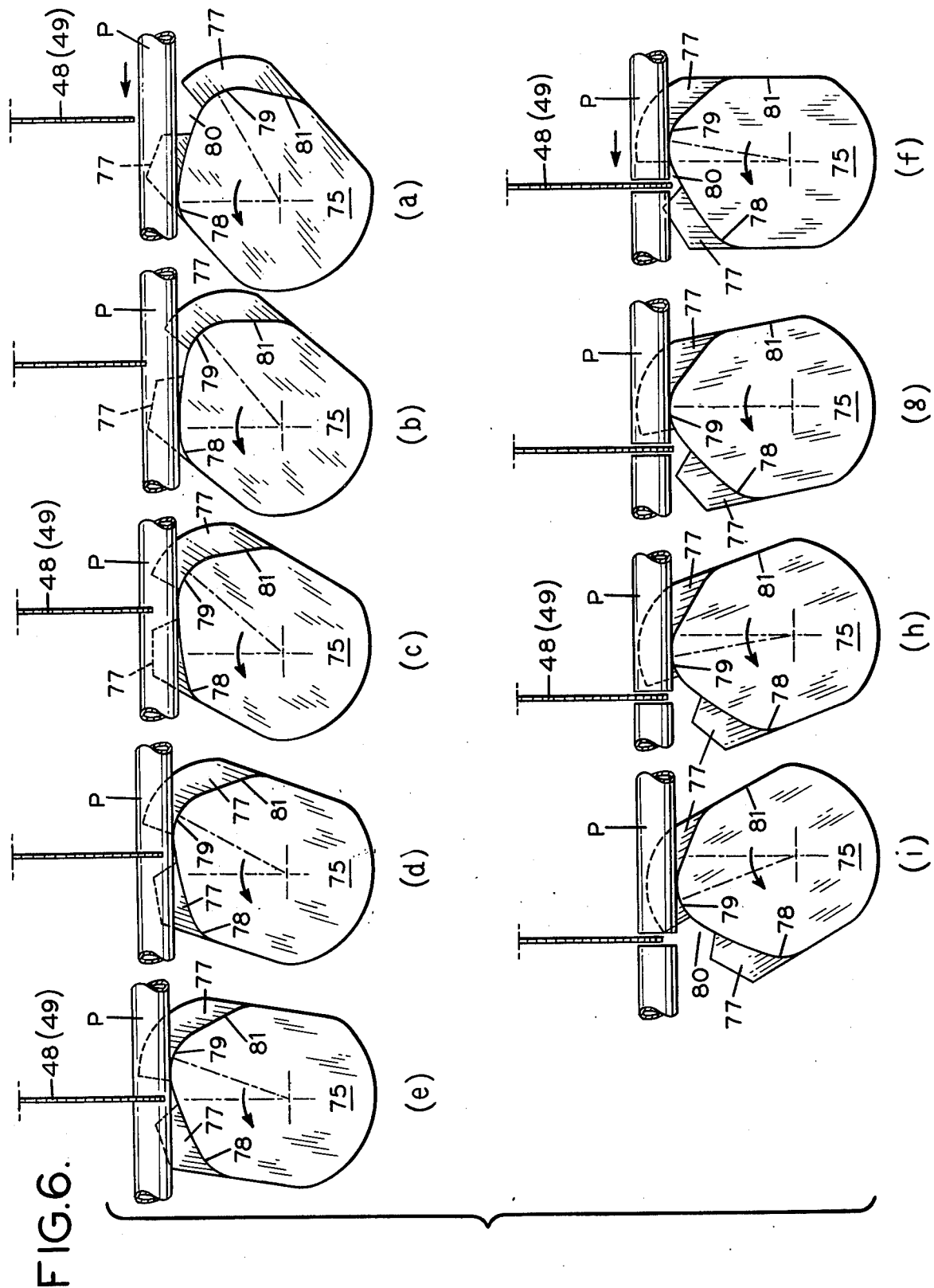
FIGS. 6(a)–6(i) are a sequence of views showing the relationship of rotary saw and pipe supporting cam, during the interval in which the saw blade is traveling through its cutting positions.

With particular reference to FIGS. 6(a)-6(i), there is illustrated a typical sequence of cam-saw blade coaction during the cutting sequence. FIG. 6(a) illustrates the position of the cam as the saw blade descends downward and in right-to-left direction, moving synchronously with the pipe section P. The cam 75, rotating in a counterclockwise direction, has been brought into a position in which the pipe has just begun to be supported by a riser surface 78. At this stage, the pipe is confined between the spaced flanges 77. In FIG. 6(b), the saw blade is entering the pipe, which continues to be supported and confined by the cam and is being raised slightly by the riser surface 78. Progressing through FIGS. 6(c), (d) and (e), the pipe is gradually raised to the crest portion 79 of the cam surface, while the saw blade continues to descend. The saw blade is now well below the upper edge of the flanges 77 and, to accommodate this, the flanges are notched as at 80.

As reflected in the sequence of FIGS. 6(e)-6(g), the synchronization of the cam and saw blade is such that the saw blade moves slightly in advance of the crest 79 of the cam surface. Accordingly, when the pipe is supported at its maximum height, the riser surface 78 drops away from the lower edge of the pipe, permitting the saw to pass completely through the lower surfaces of the pipe to complete the severance. The arc of the blade then begins to effect its upward withdrawal from the pass line, and the continued rotation of the cam brings a declining surface 81 under the pipe, lowering the pipe to its normal pass line. Throughout the remainder of its rotation, the cam need not, and preferably does not, contact the pipe, which remains supported on its regular conveyor means.

Since the cam 75 is required to be closely cooperative with the saw blades, provision is made for adjusting the height of the cam to accommodate typical variations in saw blade diameter, resulting from occasional sharpening for other reasons. Accordingly, the bearing assembly 74 is mounted on a linkage 82 pivoted at 83 on a frame member 84. The linkage 83 is also connected at 85 to a manually operated screw jack mechanism 86 carried by a frame member 87. By manipulation of the hand operated screw jack 86, the linkage 82 may be pivoted in a counterclockwise or clockwise direction to effect limited vertical adjustment of the cam mounting shafts 73. This limited vertical motion is accommodated by the universal joints 70, 71, as will be understood.

In a typical intended operating sequence, the scrap saw arrangement illustrated in FIGS. 2-6 is utilized only during the start up procedures — a transitional period in which the pipe is imperfectly formed and is scrapped. Once on-specification pipe is being produced by the forming and welding mill, the scrap saw is rendered inoperative and the pipe is permitted to pass through the stretch reducing mill 15 and onto the production cut-off saw 16. Initially, when the scrap saw is to be taken out of service, rotation of the saw frame housings 26, 27 is stopped with the housings generally parallel to the axis of the pipe, so as to maintain both saws well out of the way of the moving pipe. The cam 75 will likewise be oriented in a retracted rotary position, with the raiser portions 78, 79 and the flanges 77 well removed from the pass line. Appropriate means, such as a rotary switch device 90 (FIG. 2), which is connected in with the cam and saw housing drive, may be utilized for effecting the desired orientation of the saw frames and lifting cam when shutting down the scrap saw.

Inasmuch as the pipe forming line may be maintained in continuous operation for long periods of time after start up, it is advantageous to physically retract the scrap saw from the area of the pipe pass line, so its components are somewhat protected from the heat of the red hot pipe.

To this end, the base 19 is provided with dovetail slide surfaces 91, 92 (see FIG. 3) which respectively support and guide the housing 20 and the equipment supported thereon. The supporting frame work 93 for the housing includes a plurality of fixed guide blocks 94, on one side, and a plurality of wedge-like movable guide blocks 95 on the opposite side. The movable guide blocks are arranged to be moved vertically by hydraulic cylinders 96. In order to advance the scrap saw to its operative positoon, a fluid cylinder 97, mounted to the base 19 at 98 and connected to the housing 20 at 99, is actuated in an extending direction to move the unit forward on the base 19. When the unit is properly positioned, the cylinders 96 are actuated to draw the movable wedges 95 tightly into position, effectively locking the saw unit in its operative position. These hydraulic cylinders 96 are subsequently released, to lower the wedge blocks 95, in order to permit the unit to be retracted from the pass line.

To advantage, a guard member 100, of generally inverted U-shaped configuration is mounted to and extends forward from the main housing 20, just above the level of the guide surfaces 91, 92. When the unit is retracted, this cover plate 100 is positioned over the top of the otherwise exposed guide surfaces, to keep the surfaces free of hot metal particles and other foreign matter which may otherwise tend to accumulate on and follow the guide surfaces during the periods of nonuse of the scrap saw. A similar cover member 101 may be provided at the rear, if desired.

Figure 7:
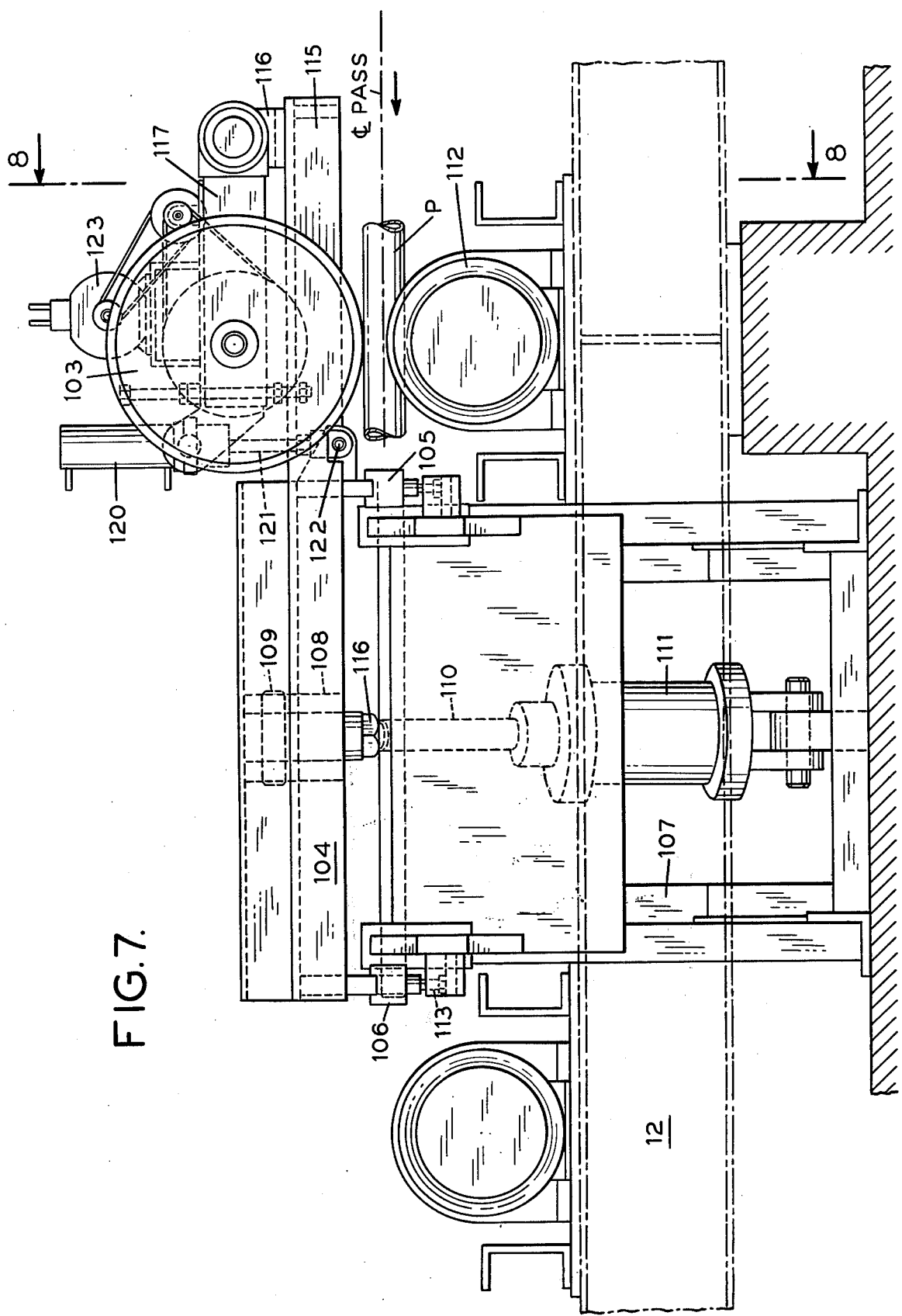
FIG. 7 is a front elevational view illustrating the discharge end section of the forming and welding mill, provided with means for synchronizing the discharge of pipe from the mill with the speed of operation of the rotary scrap saw.
Figure 8:
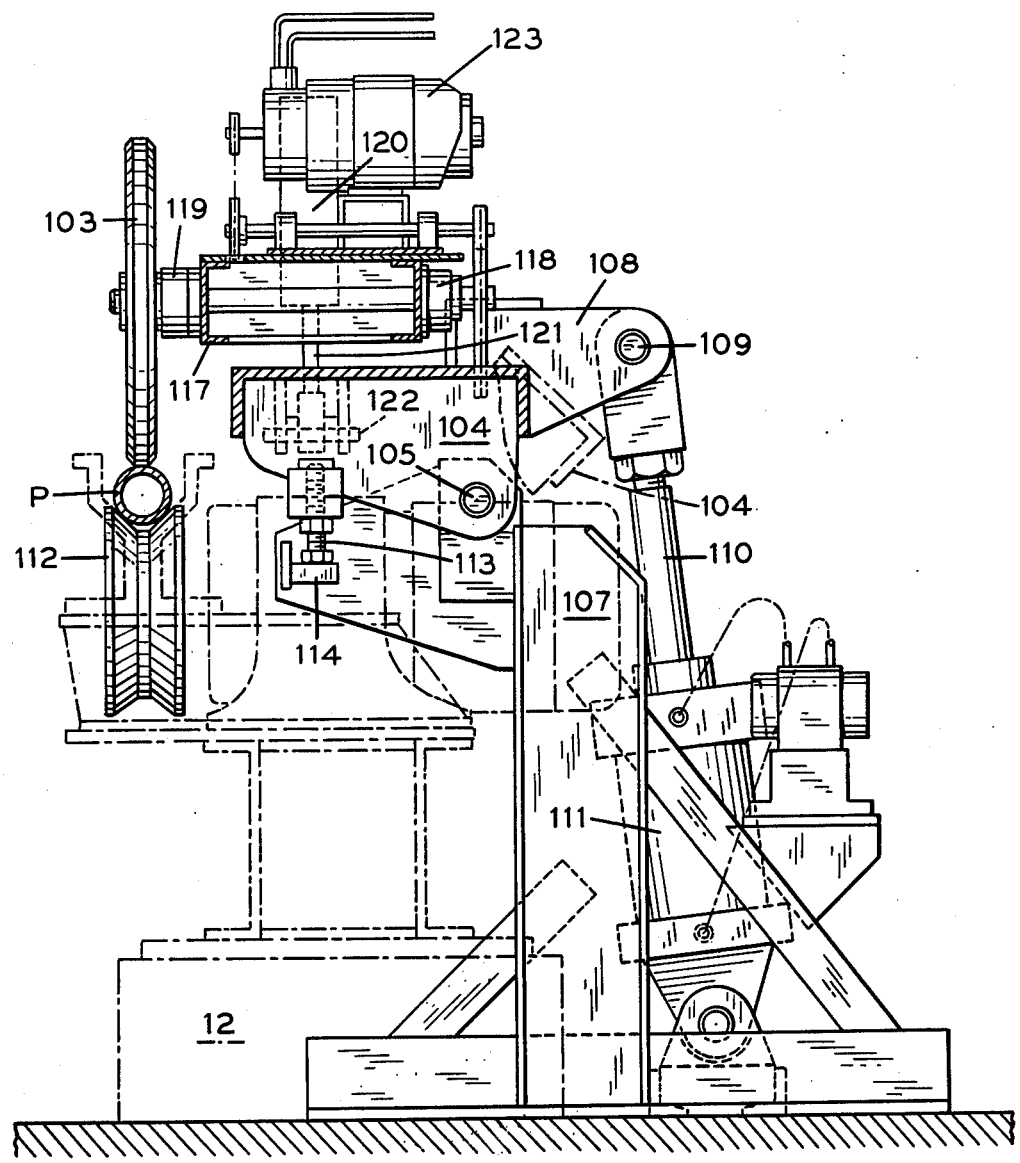
FIG. 8 is a side elevation of the equipment shown in FIG. 7, taken partly in section along line 8—8 of FIG. 7.
Figure 9:
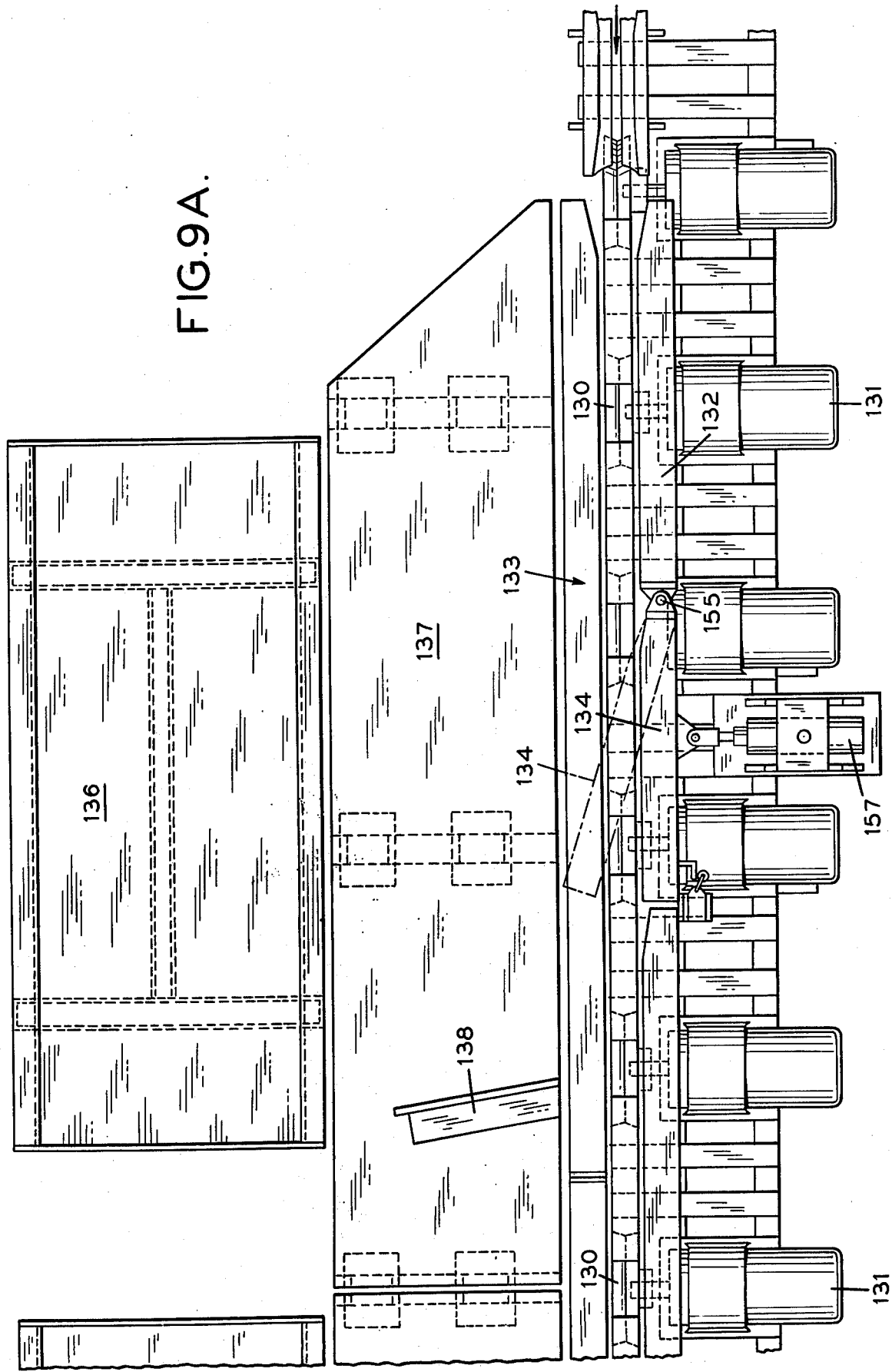
FIGS. 9A and 9B, together, constitute a top plan view of a kick-out and receiving section for the scrap pipe cut-off sections formed by the scrap saw.

With reference now to FIGS. 7 and 8, there is shown an improved arrangement for synchronization of the rate of rotation of the saw housings 26–27 with the rate of emergence of pipe from the forming and welding mill. In this respect, during the start up phase, the skelp is advanced at a low rate of speed from the forming and welding mill, and this is gradually increased until, eventually, steady-state conditions are reached. At the outset, the drive motor 43, which rotates the scrap saw frame 26–27, is electrically synchronized with the drive motor for the last stand of the forming and welding mill (not shown). This provides a reasonable approximation of speed of travel of the pipe at the scrap saw. However, as soon as the forming and welding mill commences to form round pipe, a more accurate synchronization is achieved by directly contacting the pipe with a measuring wheel 103.

The measuring station desirably is located at the upstream end of the scrap saw inlet conveyor 12, and is so constructed as to locate the wheel relatively close to the discharge end of the forming and welding mill. To advantage, the entire measuring wheel assembly is mounted on a bracket 104, which is pivoted at 105 to the stationary frame structure 107. Arms 108 are attached to the back of the bracket 104 and are connected at 109 to the operating rod 110 of a fluid cylinder 111. When the cylinder is retracted, the entire bracket 104 is tilted upward and away from the pass line of the pipe, designated by the numeral P, which is issuing from the forming and welding mill and is supported on conveyor rolls 112 of the inlet conveyor structure 12. When the cylinder 111 is actuated to extend, the bracket 104 is tilted downward and forward to an operating position, as determined by adjustable stop bolts 113 engaging stop lugs 114.

The bracket 104 includes a cantilevered beam section 115, which extends toward the forming and welding mill and carries a bracket 116 at its outer end. The bracket 116 pivotally mounts a frame 117, which has bearings 118, 119 for journaling the measuring wheel 103.

At the end opposite the pivot bracket 116, the arm structure 117 is connected to a fluid cylinder 120, whose operating rod 121 is connected to the bracket 104 at 122. The cylinder 120 controls the pressure with which the measuring wheel 103 is brought to bear against the moving pipe P.

During the initial start up phase, the stock issuing from the forming and welding mill may be badly deformed and perhaps not even closed at the seam. During this phase, the cylinder 111 is retracted to pivot the entire measuring wheel mechanism out of the way. As soon as the pipe begins to assume a round form, the cylinder is extended, to bring the measuring wheel into contact with the pipe, as shown in FIGS. 7 and 8. The rotation of the wheel will thereafter reflect precisely the speed of advance of the pipe issuing from the mill. This is detected by a tachometer 123 driven by the measuring wheel, and an appropriate signal is derived from the tachometer for accurate synchronization of the scrap saw.

In FIGS. 9–14, there are shown structural details of an automatic scrap kick-out and receiving arrangement, which is located just downstream of the scrap saw (see item 14, FIG. 1) and is operative in conjunction with the scrap saw to automatically kick out of the conveyor system the sawed scrap sections. In the illustrated arrangement, the automatic kick-out structure includes a saw outlet conveyor section comprising a plurality of pipe supporting and conveying rolls 130 driven by motors 131 and arranged to support and advance the pipe at suitably spaced intervals. Positioned above and on opposite sides of the conveyor rolls 130 are inner and outer guide rail assemblies 132, 133 respectively which provide lateral confinement of the pipe as it traverses the kick-out section. As will be described more fully, the outer guide rail assembly 133 is retractable to permit a lateral diversion of the scrap sections. Likewise, the inner guide rail assembly 132 includes one or more pivotally mounted diverter rails 134, 135 arranged to be selectively disposed at an angle across the pass line of the pipe, in order to divert a sawed off pipe section off of the conveyor rolls, over the retracted outer guide rail 133 and into a scrap bin 136.

Figure 10:
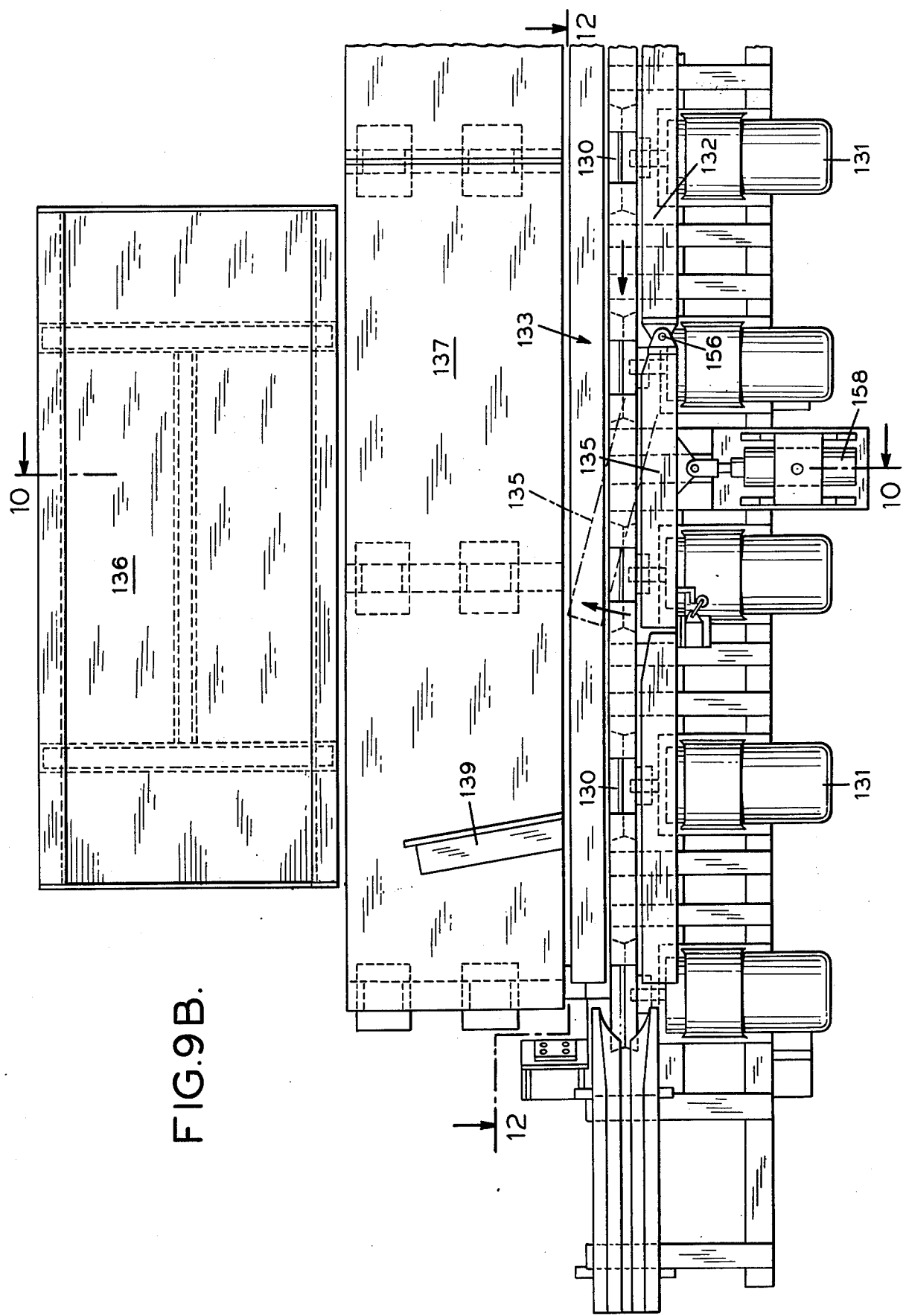
FIG. 10 is a cross sectional view as taken generally along line 10—10 of FIG. 9B.
Figure 11:
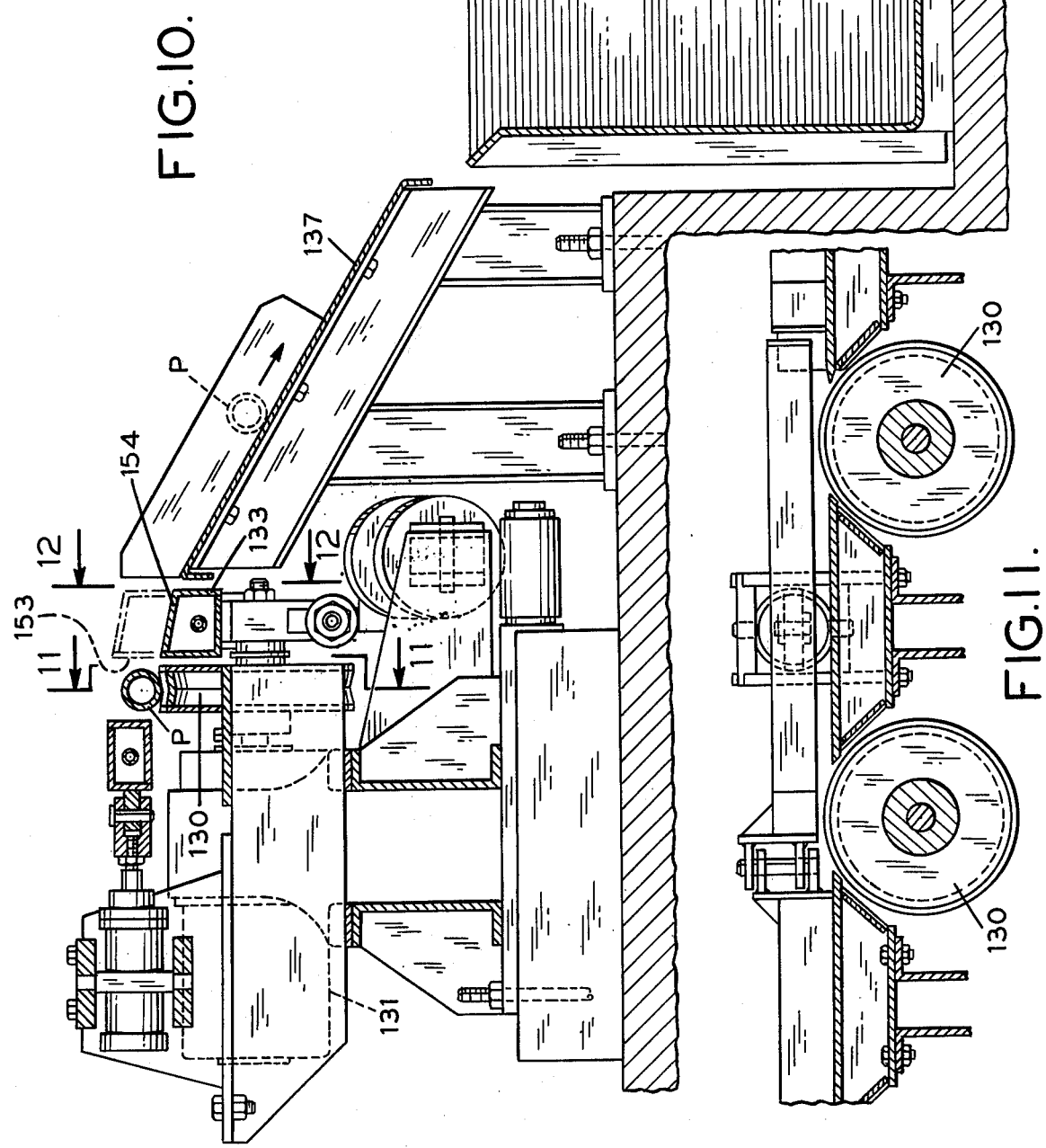
FIGS. 11 and 12 are cross sectional views as taken generally along lines 11—11, 12—12 respectively of FIG. 10.
Figure 12:
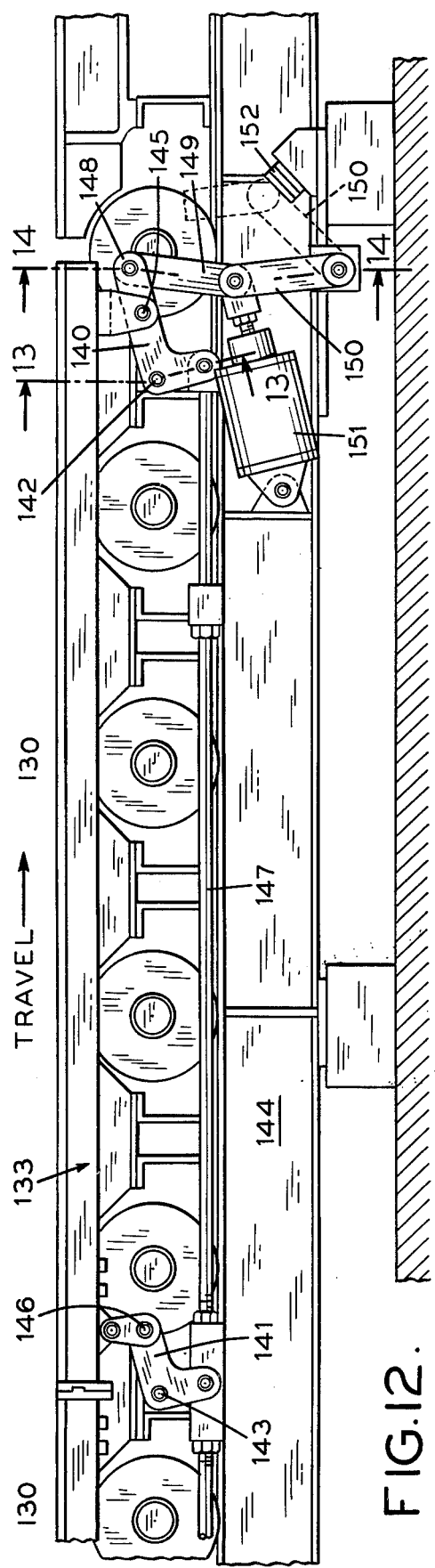
Figure 14:
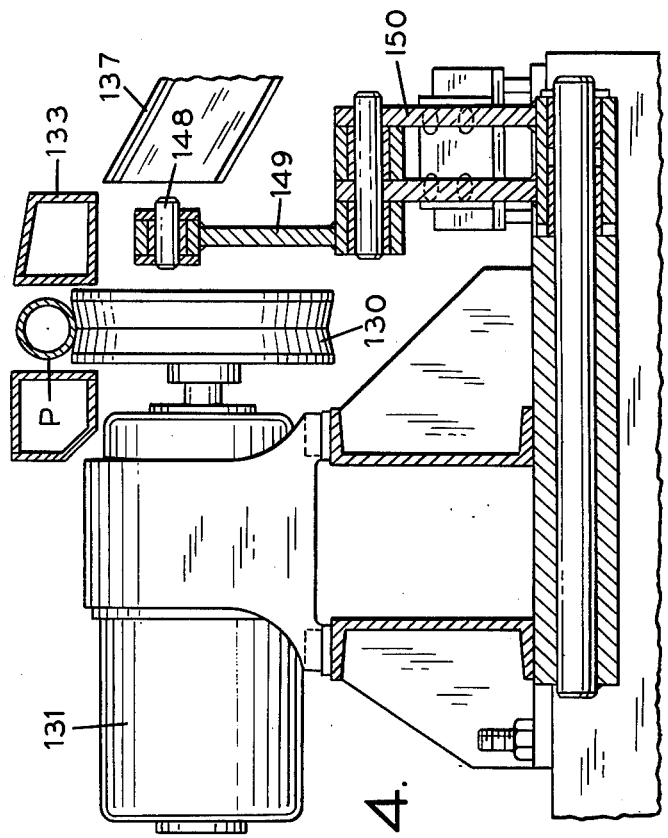
FIGS. 13 and 14 are fragmentary cross sectional views as taken generally on lines 13—13, 14—14 of FIG. 12.
Figure 13:
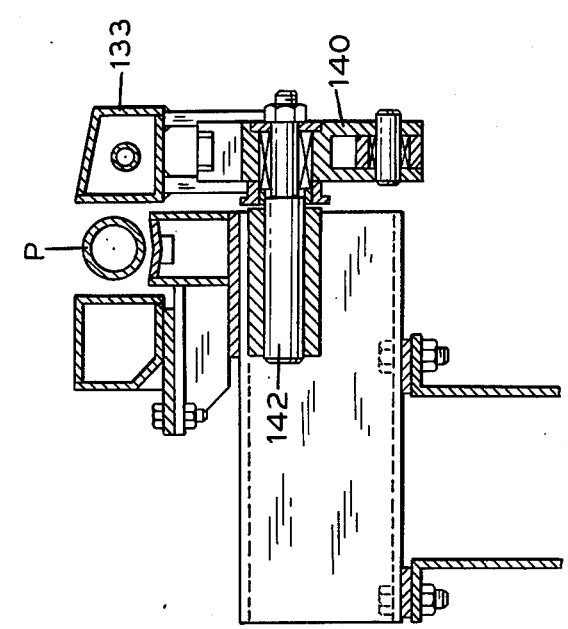

As shown particularly in FIG. 10, an inclined apron 137 is mounted adjacent the kick-out conveyor section, having one edge alongside the retractable guide rail 133 and its opposite edge above and adjacent one side of the scrap bin 136. In the illustrated arrangement, the scrap discharge arrangement includes two kick-out sections and two scrap bins, so that one of the bins may be receiving scrap sections while the other is being unloaded. The apron 137 typically will extend the full length of the kick-out section, being provided with abutment guides 138, 139 positioned near the downstream ends of the scrap bins. Thus, when a pipe section is discharged from the conveyor onto the inclined apron 137, it will roll and/or slide into the bin on the upstream side of the abutment guide.

To advantage, the retractable outer guide rail assembly 133 is mounted for generally vertical retracting movement by means of a plurality of crank levers 140, 141 pivoted at 142, 143 on the conveyor frame structure 144. The levers 140, 141 are pivotally connected at 145, 146 to the guide rail assembly 143 and are also pivotally connected at their opposite ends to a horizontally movable tie rod 147. A projecting portion 148 of one of the crank levers 140 is connected by means of a toggle linkage 149, 150 to a hydraulic cylinder 151 for pivoting the crank lever. When the cylinder 151 is retracted to a limit position, the toggle linkage 149, 150 is straightened, causing the lever 140 to be pivoted to a counterclockwise limit position to raise the guide rail 133 to its guide position. By means of the tie bar 147, all of the other crank levers 141 (there are as many as is appropriate to the length of the guide rail) are pivoted in a similar manner, so that the guide rail is moved uniformly throughout its length. When the cylinder 151 is energized to extend, the toggle linkage passes through its dead center position and pivots over against a resilient abutment stop 152. This causes the lever 140 to pivot clockwise through a substantial angle, along with all of the connected levers 141, lowering the guide rail 133. FIG. 10 illustrates the raised and retracted positions of the guide rails 133. In the upraised position, illustrated in phantom lines, the side wall 153 of the guide rail confines the pipe P passing over the conveyor wheels 130. In the retracted position, the outwardly slanted upper surface 154 of the guide rail serves as a transition surface, permitting a pipe section to roll from the rolls 130 onto the apron 137.

As best illustrated in FIGS. 9A and 9B, the diverter rail sections 134, 135 are pivotally connected at 155, 156 to the inner guide rail structure and are operably connected to fluid cylinders 157, 158.

When the scrap saw is in operation, the outer guide rail 133 is retracted and one of the cylinders 157, 158 is actuated to pivot one of the diverter sections 134, 135 across the pass line of the pipe. As successive individual pieces of cut-off scrap pipe are conveyed along the pass line, they will engage the angularly disposed diverter member and be rolled off onto the apron 137 and into the appropriate discharge bin 136. When one bin becomes filled with scrap sections, the second diverter member is brought into use and the first diverter member is retracted to its normal position. Scrap sections will then be directed into the second discharge bin, while the first is removed and emptied.

When the forming and welding mill is operating on a steady-state basis, and the scrap saw is taken out of service, the kick-out section will continue in operation momentarily, until the last section of scrap pipe has been diverted from the pass line, after which the diverter section is immediately retracted to permit passage of the specification pipe. At this time the outer guide bar assembly 133 is raised to its normal position.

In its most significant aspects, the present invention provides an entirely practical and uniquely effective multiple cutting rotary saw structure which is useful, independently of the production cut-off saw, for the severing of off-specification, buttwelded pipe into short scrap sections, which are easily handled and disposed of without significant manual intervention. The specific construction of the invention conveniently enables a plurality of cut-off blades to be mounted on a rotating frame. Other things being equal, this enables the cut-off scrap sections to be half the length that would be achievable with a single blade cut-off unit. In addition, the structure of the invention enables the radius of the rotating, blade-supporting frame to be maintained at a relative minimum, enabling a greater number of cycles of operation to be achieved while maintaining synchronism between the cut-off blade and the moving pipe. This enables further reduction in the length of the cut-off sections, as will be understood.

In the structure of the invention, the individual rotating cut-off blades, rather than being driven by individual motors suspended on the rotating frame, are driven from a single, remotely located drive motor, through a shaft which extends concentrically through the center of the tubular main shaft on which the saw frame rotates. This minimizes both bulk and mass at the extremities of the rotating frame. The load forces on the system are maintained at a minimum.

Since the rotary scrap saw operates in a "hostile" environment, the structure is such that most of the moving parts of the system are completely housed within the members forming the blade supporting frames. In this respect, a pair of frame spaced housings are provided, the inboard frame including a gear train system for maintaining vertical orientation of the saw blades, and the outboard housing including a drive gear train for rotating the saw blades. The electric drives for the saw blades and rotating frame are located well away from the pass line, so as to be least effected by the hostile envornment.

To advantage, the all-mechanical high speed saw blade drive, which is housed in and carried by the saw frame housings, includes rotating counterbalance-fly wheel members on the opposite ends of the saw blade shafts. This both improves the balance of the saw blade supports and enables a reduction in the overall size of the saw blade drive system from the motor, because of the energy storage in the fly wheel for utilization when the saw blade enters the work. In this respect, a rotating mass of the idle saw blade and fly wheel combination provides available kinetic energy for the working saw blade, when the latter enters the work.

Since the radius of the saw frame arms is maintained as short as practicable, the effective penetration of the saw blade within a given arc of rotary movement of the frame is advantageously augmented by synchronized rotation of the flanged positioning cam 75. Thus, each time the saw blade approaches the pipe in a descending arc, the pipe is simultaneously engaged and lifted by the synchronously rotating cam. This enables the saw blade to completely sever the pipe within a shorter arc than would otherwise be possible. By utilizing an appropriately shaped cam, the cam may be mounted for rotation about a normally fixed axis, although means desirably is provided for adjusting the location of that axis from time to time to accommodate variations in the diameter of the saws from dressing, etc.

Synchronization of the scrap saw with the moving pipe is optimized by utilizing a combination of control take offs, one from the last stage of the forming and welding mill and a second from a precision measuring wheel. During the first phase of the start up procedure, the rotating scrap saw is electrically synchronized with the drive motor for the last stage of the forming and welding mill. However, as soon as a round pipe has been formed, this synchronization control is replaced by a more precise control involving the use of a retractable measuring wheel driving a tachometer-generator device. Pursuant to one aspect of the invention, the entire measuring wheel and its tachometer-generator system is mounted for pivotable movement toward and away from the pass line of the pipe, so as to be easily and quickly moved out of the way during the periods prior to formation of a suitably round pipe.

The system of the invention also includes, for use in conjunction with the rotating scrap saw, an advantageous form of outlet conveyor with scrap kick-out means. The mechanism includes a conveyor means, typically a plurality of trough shaped rolls, in conjunction with inboard and outboard guide rails. The outboard guide rail is selectively retractable, and the inboard guide rail includes one or more pivotable diverter sections. When the scrap saw is in operation, the outboard guide rail is retracted and one of the inboard sections is moved to diverting position, such that the individual pieces of scrap pipe are kicked off the conveyor, down an inclined apron and into a disposal bin as they are carried along the conveyor axis. When steady-state conditions are reached, the guide rails are brought back to their normal or guiding positions and function to guide the specification pipe on to the next station, typically a stretch reducing mill.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A plural rotary saw for on-line cut-off of continuously moving stock, which comprises
   a. a normally stationary main frame structure,
   b. a saw frame structure journaled in said main frame for rotation about an axis at right angles to and vertically offset from the pass line of the stock,
   c. said saw frame structure including a main shaft journaled in the main frame and extending forward therefrom in cantilever fashion,
   d. spaced inboard and outboard saw frame housings mounted on said main shaft and rotatable therewith,
   e. a plurality of cutting saw units mounted by and between said saw frame housings and individually rotatable about axes spaced equally from and parallel to the axes of said main shaft,
   f. said cutting saw units being generally equi-angularly spaced with reference to said main shaft whereby constant speed rotation of said main shaft will move successive cutting saw units into cutting position at generally uniform intervals,
   g. each of said cutting units including an individual housing rotatably mounted by said saw frame housings and maintained in a fixed angular orientation with reference to the pass line, and a rotating saw blade journaled in said support housing for rotation about an axis parallel to the pass line, and
   h. a common drive means for said cutting units including a common drive shaft coaxial with and journaled within said main shaft, and means in one of said saw frame housings forming a drive connection between the common drive shaft and the individual cutting units.

2. The plural rotary saw of claim 1, further characterized by
   a. each of said cutting units including a fly wheel rotatable with the saw blade to provide rotating inertia, and
   b. all of said units being connected together through said common drive shaft, whereby the rotating inertia of one unit can supply energy to another cutting unit.

3. The plural rotary saw of claim 1, further characterized by
   a. said main shaft extending to and directly supporting the outboard saw frame housing,
   b. said common drive shaft extending through said main shaft and terminating at said outboard housing,
   c. individual cutting unit drive shafts extending coaxially through said individual support housings for driving said saws, and
   d. drive means in said outboard housing connecting said common drive shaft to said individual drive shafts.

4. The plural rotary saw of claim 3, further characterized by
   a. orienting means in said inboard housing for interconnecting said individual cutting unit housings with said main frame structure for maintaining a constant angular orientation between said individual cutting units and said pass line.

5. The plural rotary saw of claim 4, further characterized by
   a. said orienting means including a ring gear fixed to said main frame structure in surrounding relation to said main shaft,
   b. an orienting gear of equal size to said ring gear carried by each of said individual housings, and
   c. an idler pinion interconnecting each orienting gear with the ring gear.

6. A dual rotary scrap cut-off saw for a continuous buttweld mill, which comprises
   a. a main frame,
   b. means for moving said main frame at right angles to the pass line of the mill, between operative and retracted positions,
   c. a main shaft journaled in said main frame and controllably rotatable therein,
   d. said main shaft having a portion extending forward in cantilever fashion from said main frame,
   e. saw frame means mounted on said main shaft and rotatable therewith,
   f. a pair of cutting saw units mounted at opposite outer ends of said saw frame means,
   g. means for maintaining a constant angular orientation of said cutting saw units, and
   h. a single common drive means for simultaneously driving both of said cutting saw units.

7. The dual rotary saw for claim 6, further characterized by
   a. said common drive means including a stationary drive motor mounted on said main frame.

8. The dual rotary saw of claim 7, further characterized by
   a. said common drive means further including a common drive shaft coaxial with said main shaft, and
   b. means connecting both of said cutting saw units to said common drive shaft.

9. The dual rotary saw of claim 8, further characterized by
   a. each of said cutting saw units including a rotating saw shaft mounted and oriented parallel to the pass line,
   b. each of said rotating saw shafts carrying a saw blade at one end and a fly wheel at the other end.

10. The dual rotary saw of claim 6, further characterized by
    a. said common drive means including gear train means carried by said saw frame means.

11. The dual rotary saw of claim 6, further characterized by
    a. said means for maintaining constant angular orientation of said cutting saw units comprising gear train means carried by the saw frame means.

12. The dual rotary saw of claim 6, further characterized by
    a. said means for moving said main frame comprising cooperating guide and guide rail means for said main frame, and
    b. means for clamping said guide and guide rails together when said main frame is in its operative position.

13. The dual rotary saw of claim 6, further characterized by a. a rotating cam carried by said main frame and positioned below said cutting saw units,
b. said cam being rotated in predetermined synchronism with said saw frame members, whereby to raise the stock toward a cut-off saw during the period when a cutting saw unit is moving through its cutting position.

14. The dual rotary saw of claim 13, further characterized by a. said cam rotating in a direction tending to advance the stock,
b. said cam having riser and drop-off surface portions, engagable with the stock in the period when a cutting saw unit is approaching and departing its lowest position,
c. the highest point on said riser portion engaging said stock in offset relation to the cutting saw to provide clearance for said saw to pass through and sever the stock.

* * * * *